Patented Aug. 17, 1948

2,447,050

UNITED STATES PATENT OFFICE 2,447,050

ORGANIC HYDROXY COMPOUND AND DERIVATIVES THEREOF

Joseph E. Bludworth and Donald P. Easter, Cumberland, Md., assignors to Celanese Corporation of America, a corporation of Delaware No Drawing. Application September 21, 1944, Serial No. 555,204

3 Claims. (Cl. 260—611)

This invention relates to the production of organic compounds and relates more particularly to a novel method for the production of 1-cyclohexyl-butanol-3 and to the ether and ester derivatives thereof.

An object of our invention is to provide an improved process for the preparation of 1-cyclohexyl-butanol-3.

Another object of our invention is the preparation of novel and valuable ethers and esters of 1-cyclohexyl-butanol-3.

Other objects of our invention will appear from the following detailed description.

In accordance with the Diels-Alder reaction, the condensation of acrolein with butadiene yields $\Delta^3$-tetrahydrobenzaldehyde. On reacting this aldehyde with acetone in the presence of potassium hydroxide $\beta$-($\Delta^3$-tetrahydrophenyl)-vinyl methyl ketone is formed which yields many new and valuable compounds on further reaction.

We have now discovered that by effecting the catalytic reduction of $\beta$-($\Delta^3$-tetrahydrophenyl)-vinyl methyl ketone with hydrogen in the presence of a nickel catalyst, a valuable higher molecular weight alcohol is obtained, namely, 1-cyclohexyl-butanol-3, which alcohol has the formula

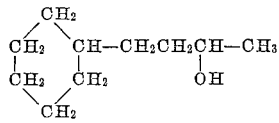

When esterified with suitable organic acids or etherified with alcohols or other etherifying agents, this alcohol yields novel ether and ester derivatives which are valuable as plasticizers, as intermediates in the preparation of higher molecular weight compounds and for other industrial applications.

The reduction of $\beta$-($\Delta^3$-tetrahydrophenyl)-vinyl methyl ketone may be effected conveniently by employing hydrogen as the reducing agent and at pressures of from about 15 to 2000 lbs. per sq. inch while maintaining the temperature at from 20 to 100° C. Higher pressures may also be employed. In carrying out the reduction the $\beta$-($\Delta^3$-tetrahydrophenyl)-vinyl methyl ketone is preferably dissolved in an inert organic solvent such as, for example, ethyl alcohol, methanol or diethyl ether, a hydrogenation catalyst such as nickel added to the solution, and the $\beta$-($\Delta^3$-tetrahydrophenyl)-vinyl methyl ketone reduced with the hydrogen under the desired pressure.

In order further to illustrate our invention but without being limited thereto the following examples are given:

Example I 25 parts by weight of $\beta$-($\Delta^3$-tetrahydrophenyl)-vinyl methyl ketone boiling at 118–120° C./10 mm. are dissolved in 400 parts by weight of ethyl alcohol and 50 parts by weight of Raney nickel are added thereto. The mixture is hydrogenated under 1200 lbs. per sq. inch hydrogen pressure for six hours at a temperature of 35° C. The mixture obtained is filtered, the alcohol evaporated off and the residue distilled. The 1-cyclohexyl-butanol-3 which is obtained is a colorless liquid of pleasant odor boiling at 90–94° C./7 mm. The yield is 89% of the theoretical.

Example II 28 parts by weight of 1-cyclohexyl-butanol-3, prepared as in Example I, are mixed with 32 parts by weight of propionic anhydride, and the mixture refluxed for one hour. The mixture is then cooled, neutralized with sodium bicarbonate and the ester separated by ether extraction. The ether is evaporated off and the ester purified by distillation under reduced pressure. The propionic acid ester of 1-cyclohexyl-butanol-3 boils at 102–106° C./6 mm.

Example III

To a solution of 156 parts by weight of 1-cyclohexyl-butanol-3, in 250 parts absolute diethyl ether is added in small pieces 23 parts of metallic sodium at such a rate as to keep the ether slowly refluxing. When the addition of sodium is complete, 63 parts of dimethyl sulfate is added with stirring, keeping the ether gently boiling. Cooling may be applied if the reaction tends to become violent during the initial stages of the addition. After the dimethyl sulfate has been added, the mixture is stirred and refluxed for one hour. The sodium sulfate precipitate is then filtered out, the ether evaporated off the filtrate, and the methyl ether of 1-cyclohexyl-butanol-3 purified by distillation under reduced pressure. The yield is about 75% of theory.

The 1-cyclohexyl-butanol-3 may be esterified with other acids such as, for example, butyric, acrylic, succinic, phthalic, and hexahydrobenzoic acid to produce valuable esters. As examples of other ethers which may be formed there may be mentioned the ethyl, propyl, butyl, lauryl and benzyl and phenyl ethers, and the ethers of such polyhydric alcohols as ethylene glycol, propylene glycol and glycerol.

It is to be understood that the foregoing detailed description is given merely by way of illustration and that many variations may be made therein without departing from the spirit of our invention.

Having described our invention, what we desire to secure by Letters Patent is:

1. Compounds of the following general formula

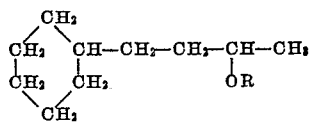

wherein R is a member of the group consisting of lower alkyl, benzyl and phenyl radicals.

2. The methyl ether of 1-cyclohexyl-butanol-3.

3. Process for the production of the methyl ether of 1-cyclohexyl-butanol-3, which comprises methylating 1-cyclohexyl-butanol-3 with dimethyl sulfate.

JOSEPH E. BLUDWORTH.
DONALD P. EASTER.

REFERENCES CITED

The following references are of record in the file of this patent:

FOREIGN PATENTS

| Number | Country | Date |
|---|---|---|
| 476,189 | Great Britain | Dec. 3, 1937 |
| 826,580 | France | Jan. 8, 1938 |

OTHER REFERENCES

Beilstein: 4th edition, vol. VI, supplement, page 18, referring to an article of Varon in Comptes Rendues, vol. 154, page 1706 et seq.